United States Patent [19]

Schmidt

[11] 3,919,665
[45] Nov. 11, 1975

[54] LASER WITH TRANSVERSE MODE AND FREQUENCY SELECTION

[75] Inventor: Werner Schmidt, Aalen, Germany

[73] Assignee: Carl Zeiss Stiftung, Oberkochen, Germany

[22] Filed: July 2, 1974

[21] Appl. No.: 485,288

[30] Foreign Application Priority Data
July 12, 1973   Germany.........................2335389
Feb. 14, 1973   Germany.........................2307123

[52] U.S. Cl............................................. 331/94.5 C
[51] Int. Cl.² ........................................ H01S 3/086
[58] Field of Search ................................... 331/94.5

[56] References Cited
UNITED STATES PATENTS
3,628,173   12/1971   Danielmeyer...................... 331/94.5

OTHER PUBLICATIONS
McClung et al., Longitudinal Mode Control in Giant Pulse Lasers. IEEE J. Quant. Elect., QE-1, No. 2, (May 1965), pp. 94–99.

Primary Examiner—William L. Sikes
Attorney, Agent, or Firm—Stonebraker, Shepard & Stephens

[57] ABSTRACT

A laser in which one of the two reflectors at the ends of the laser assembly is in the form of a roof prism, the other or second reflector being conventional. A Fabry-Perot etalon is arranged between the second reflector and the laser cell, the etalon being tiltable about an axis which is at either 45° to or parallel to an axial plane containing the apex line of the roof prism. An optically active plane parallel plate is located between the etalon and the laser cell, in one embodiment, or between the laser cell and the roof prism, in another embodiment.

6 Claims, 5 Drawing Figures

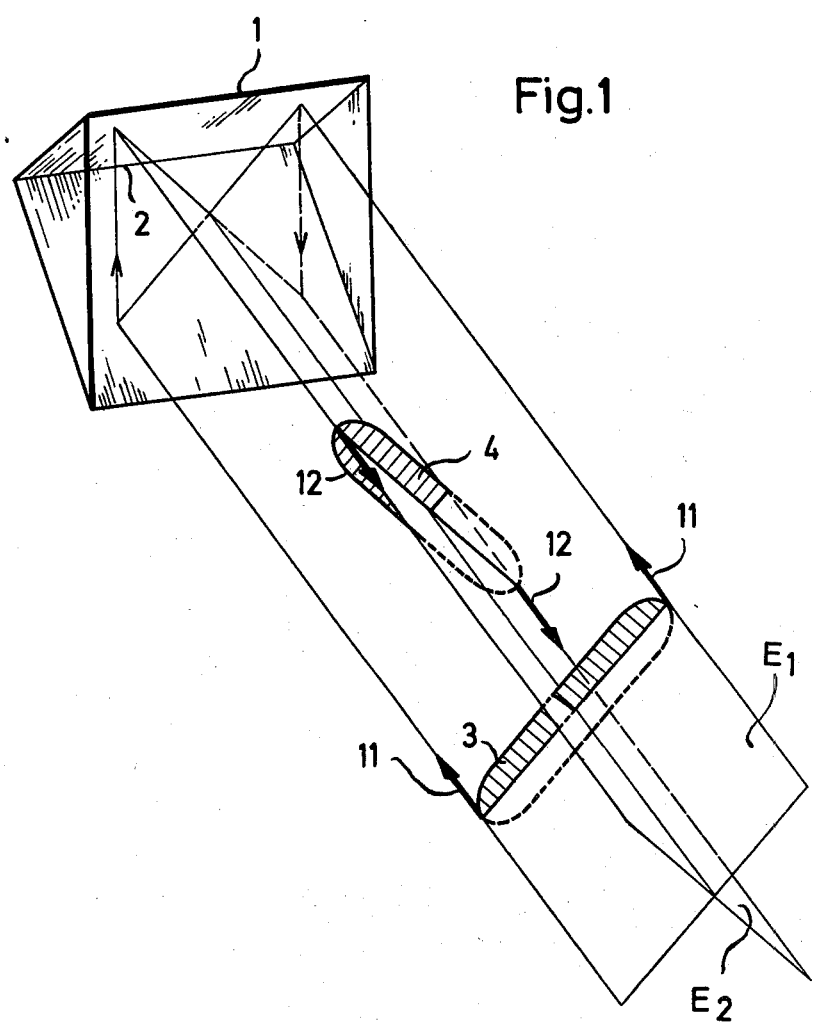

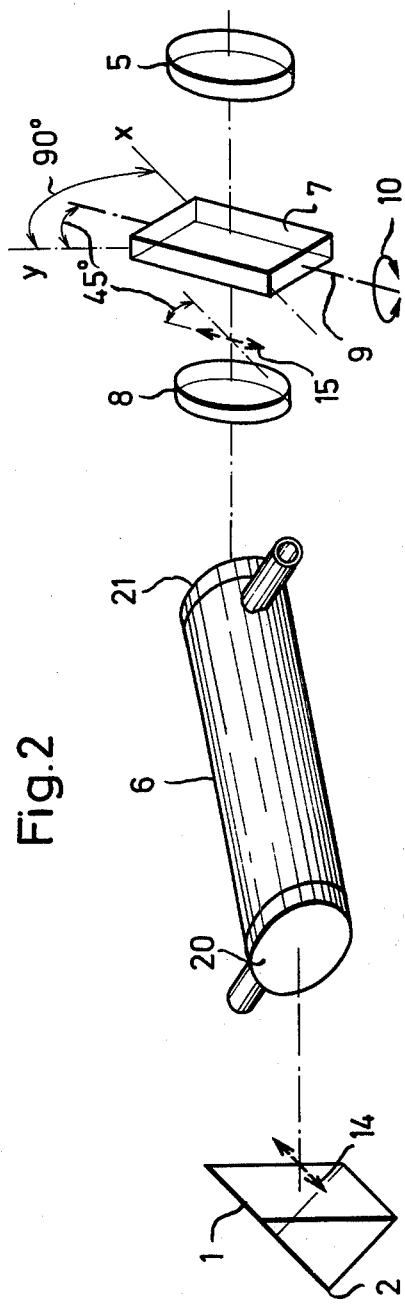
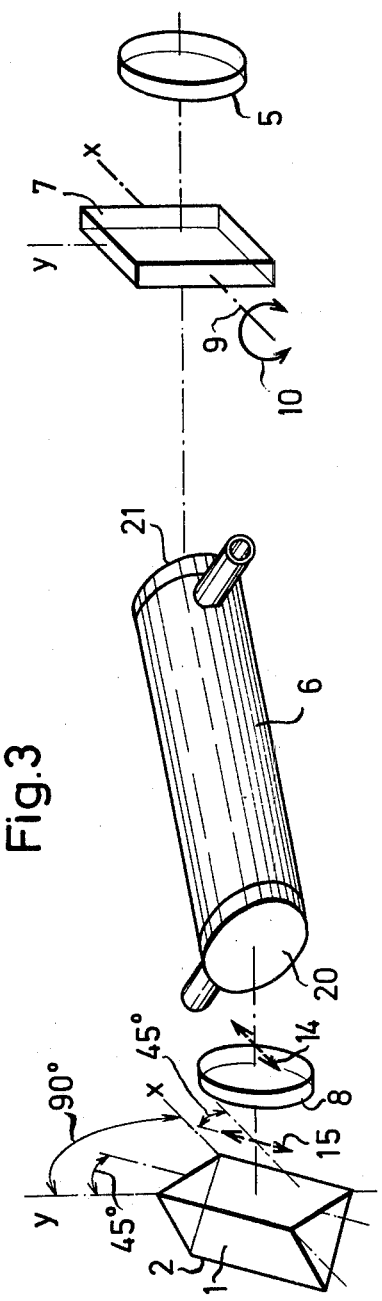

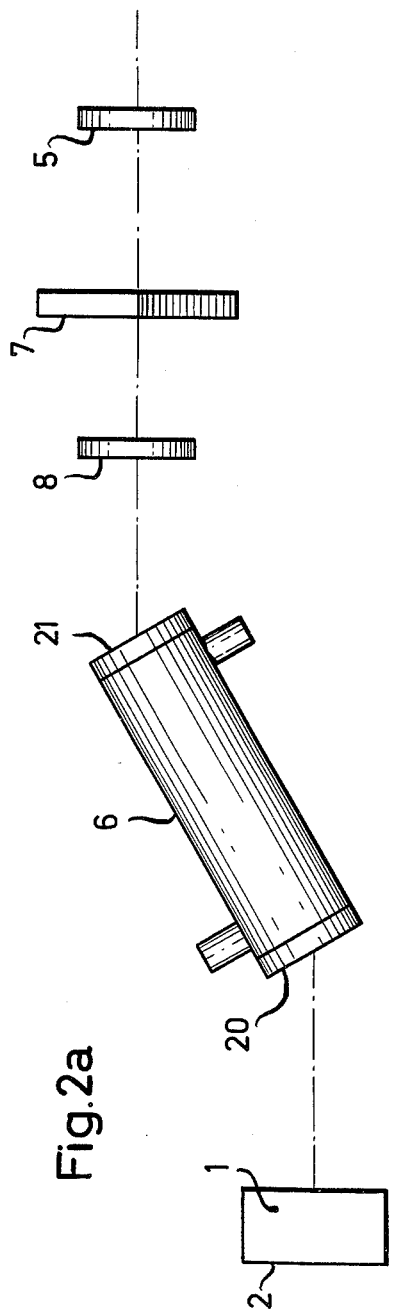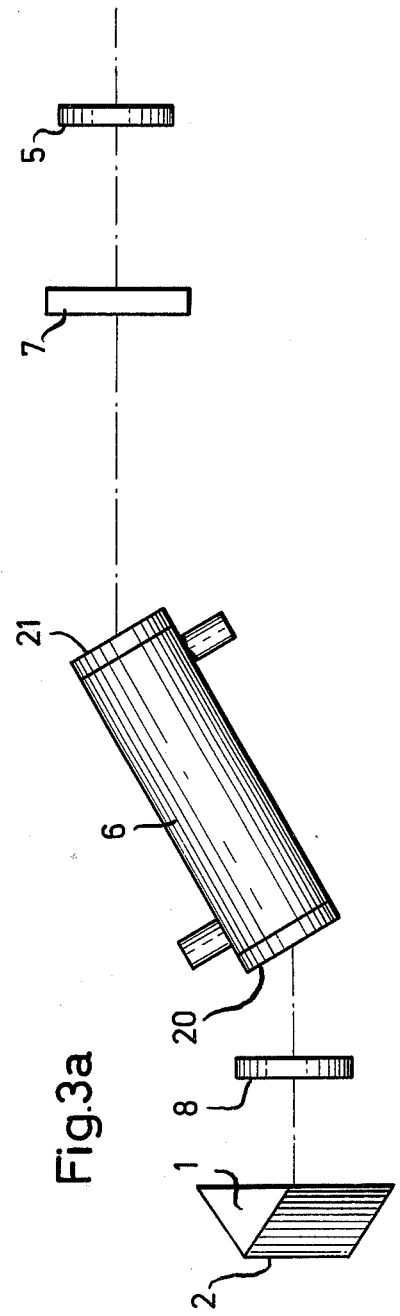

LASER WITH TRANSVERSE MODE AND FREQUENCY SELECTION

BACKGROUND OF THE INVENTION

The invention relates to lasers having an emission fixed to one or several transverse modes of oscillation and to one or several wavelengths, comprising an active laser substance arranged between two resonator mirrors, and further comprising an arrangement to excite the same, and wherein one of the resonator mirrors is designed as a roof prism and wherein further a mode filter is arranged between the other reasonator mirror and the laser active substance.

In many fields of application of coherent radiation it is desirable or necessary that the output radiation consists of a single-phase wave front. Single-phase emitting lasers are used for example for holographic purposes. When exploiting non-linear effects in certain crystals, where for example the frequency of the impinging light is doubled, especially high outputs are reached with single-phase rays.

Laser radiation with single-phase wave fronts are to be produced by selection of the transverse fundamental oscillation, which is designated as $TEM_{00}$-mode.

It is known to use, for transverse mode selection, two Fabry-Perot etalons of suitable thickness which are arranged tiltably between the laser active substance and one of the two resonator mirrors. This is described in "Applied Optics" magaine for April, 1963, volume 2, no. 4, pages 448 –449. Such a device has for one or more discreet directions and wavelengths maximum for sweep-flyback in the resonator. The directions may be adjusted to the traveling directions of individual transverse oscillation modes of the laser, especially to the $TEM_{00}$-mode. Such a device is suitable especially for dye lasers which emit in a large range of wavelengths. Under maintenance of the fundamental mode selection, the emission of the dye laser may be tuned continuously by changing the tilting angle of the Fabry-Perot etalon. The tilting angles of Fabry-Perot etalons with equal thickness follow the function of the wavelength, while the tilting angles of Fabry-Perot etalons with different thickness have to be changed according to different functions of the wavelength. A disadvantage of this device is that because of the necessary precision of the adjustment of both tilting angles, the precision requirement of the tilting mechanism is extremely high.

Longitudinal amplitude selection devices are known in which a roof prism is used in combination with a mode-filter. See Institute of Electrical and Electronic Engineers Journal of Quantum Electronics QE-1, May 1965, pages 94 –99.

It is an object of the present invention to provide an operating mechanism for an interference-transverse mode filter, which differs from the prior art by simpler handling and at the same time by a relatively high yield of the $TEM_{00}$- mode in the output radiation.

SUMMARY OF THE INVENTION

The invention starts from the following considerations: The divergence of a divergent light beam of oval cross-section impinging vertically upon a roof prism is great in a plane $E_1$ and small in a plane $E_2$ perpendicular thereto. Assuming the roof apex of the prism be arranged so that it constitutes the angle bisector between the planes $E_1$ and $E_2$, then when reflected from the roof the beam is rotated about its axis through 90°. The effect of this is that after reflection, the divergence is great in the plane $E_2$ and small in the plane $E_1$. Now, if in a laser resonator, a resonator mirror is designed as a roof prism, and if between the laser-active substance and the other resonator mirror there is incorporated a Fabry-Perot etalon having a tilt axis in the plane $E_1$, then the divergence of a light beam during passage through the Fabry-Perot etalon will be cut in the plane $E_1$, while the divergence remains unchanged in the plane $E_2$. After reflection from the roof prism in the second passage of the light beam through the Fabry-Perot etalon its residual divergence is cut. Thereby the possible direction of propagation is fixed to the line of intersection of the two planes $E_1$ and $E_2$ which coincides with the resonator axis. The angle of tilt at least necessary for the fundamental mode selection can be derived from the equations $$S = 2nd \sqrt{1 - \frac{\sin^2\phi}{n^2}} \quad (1)$$

and $$S = m\lambda \quad (m=\text{integral}) \quad (2)$$

In these equations:

$\phi$ = angle under which the light leaves the Fabry-Perot etalon
$d$ = thickness of the Fabry-Perot etalon
$n$ = refractive index of the Fabry-Perot etalon
$S$ = phase difference between two successive partial waves leaving the Fabry-Perot etalon
$\lambda$ = wavelength.

The object of the invention is solved by providing for the mode selection a Fabry-Perot etalon together with a roof prism, whereby the Fabry-Perot etalon is mounted tiltably about an axis which is inclined at 45° to the direction of the apex line of the roof prism.

To prevent ellipticities which occur with the reflection from the reflecting layers of the inclined Fabry-Perot etalon or from the roof prism, if the plane of polarization is neither parallel nor perpendicular to the plane of incidence, and which lead to increased resonator losses, an optically active plane parallel plate or a plate of doubly refracting material can be provided in the resonator system to much advantage.

In the event that the plane of polarization is parallel or perpendicular to the roof of the roof prism (i.e., to the apex line or intersection line of the roof of the prism) and thus is inclined through 45 relative to the plane of incidence at the Fabry-Perot etalon, the optically active plane parallel plate is mounted in front of the Fabry-Perot etalon, so that the plane of polarization is perpendicular or parallel to the plane of incidence during passage through the Fabry-Perot etalon. Upon return, the rotation will be cancelled. The thickness $d$ of the optically active plane parallel plate is to be chosen according to its optical rotatory power ($\alpha$) so that the plane of polarization is rotated through $\alpha=45°\alpha=(\alpha)$ .$d=45°$ \quad (3)

In the event that the plane of polarization is parallel or perpendicular to the plane of incidence of the Fabry-Perot etalon, an optically active plane parallel plate which rotates the plane of polarization of the light through 45°, can be mounted in front of the roof prism so that no ellipticities can occur upon reflection from the roof prism. The purpose of using an optical active plane parallel plate is to rotate the oscillating plane of the light so that in the prism no ellipticity may occur. Instead of the optically active plane parallel plate a plate of doubly refracting material can be used which during two passages compensates the ellipticity occurring during reflection in the prism.

A few embodiments of this invention will now be described more fully with reference to the accompanying drawings.

BRIEF DESCRIPTION OF THE DRAWINGS

FIG. 1 is a schematic representation of the planes of divergence of a light beam of oval beam cross-section impinging upon a roof prism;

FIG. 2 is a schematic representation of a device according to the invention including an optically active plate arranged in front of the Fabry-Perot etalon;

FIG. 3 is a schematic representation of a device according to the invention including an optically active plate arranged in front of the roof prism; and FIGS. 2a and 3a are plan views of the arrangements shown in FIGS. 2 and 3, respectively.

DESCRIPTION OF THE PREFERRED EMBODIMENTS

In FIG. 1, a roof prism 1 has a roof whose apex line (intersection line of the two planes of the roof) is indicated at 2. The reference numeral 3 designates the cross-section of a divergent light beam 11 impinging upon the prism 1, and reference numeral 4 designates the cross-section of the light beam 12 reflected from the prism 1. With incoming beam 11, the divergence is great in the plane referenced $E_1$ and small in the plane $E_2$ perpendicular thereto. When reflected, the cross-section of the light beam 11 is rotated at the roof through 90° about its plane. For the returning beam 12 thereby the divergence becomes great in the plane $E_2$ and small in the plane $E_1$.

The schematic illustration in FIG. 1 is intended to show how the use of a roof prism as one of the reflectors of the laser, serves to narrow the beam. This is one of the important features of the present invention.

Reference is now made to FIG. 2, which shows the roof prism in combination with certain other features, according to one embodiment of the invention. The roof prism 1 is used as one of the two reflectors of the laser, the other reflector being of conventional kind and being shown at 5. The laser cell 6 is pumped or excited in the conventional way.

A Fabry-Perot etalon 7 tiltable in a direction 10 and an optically active plate 8 are mounted between the reflector 5 and the laser cell 6. The tilt axis 9 of the Fabry-Perot etalon 7 lies in the plane $E_1$ of the beam 11 (shown in FIG. 1 but not shown in FIG. 2) impinging upon the roof prism. During passage through the Fabry-Perot etalon 7 the divergence of a beam coming from the reflector 5 is cut in the plane $E_1$, while the divergence in the plane $E_2$ remains unchanged. After reflection at the roof prism 1 the beam rotated through 90° about its axis when passing through the Fabry-Perot etalon 7 is cut in the plane $E_2$.

The plane of polarization of the light beam is given by the Brewster-windows 20, 21 of the cell 6. Since the tilt axis of the Fabry-Perot etalon 7 is inclined through 45° to the roof 2 of the roof prism 1, the plane of polarization can be either parallel or perpendicular to the roof (i.e., the apex line) of the roof prism 1, and is then inclined through 45° relative to the plane of incidence at the Fabry-Perot etalon. In the alternative case the plane of polarization is parallel or perpendicular to the plane of incidence of the Fabry-Perot etalon 7 and is inclined through 45° relative to the plane of incidence at the roof prism 1.

In both cases ellipticities occur which impair the resonator quality. The first case is illustrated in FIG. 2. The plane of polarization is illustrated as double arrow 14 shown in dotted lines and is parallel to the roof 2 and parallel to the x-axis of the FAbry-Perot etalon 7 which is inclined such that there is an angle of 45° between the plane of polarization 14 and the plane of incidence. To avoid interfering ellipticity, the optically active plane parallel plate 8 rotating the plane of polarization 14 of the laser light through 45° into the new plane 15 prior to its entry into the Fabry-Perot etalon, is arranged in front of the Febry-Perot etalon 7. After reflection of the light at the reflector 5 upon its return and prior to entry into the laser cell 6 during repeated passage through the optically active plane parallel plate 8, the rotation of the plane of polarization is cancelled again.

The second case is illustrated in FIG. 3. The plane of polarization 14 is parallel to the plane of incidence of the light at the Fabry-Perot etalon 7 into which also falls the x-axis. The roof prism 1 is so inclined that there is an angle of 45° between its plane of incidence and the plane of incidence at the Fabry-Perot etalon. The optically active plate 8 is arranged between the laser cell 6 and the prism 1, whereby again with repeated passage the ellipticity occurring upon reflection in the prism is compensated.

What is claimed is:

1. A laser assembly comprising a laser cell having an optical axis, a roof prism reflector spaced axially from one end of said cell, said roof prism having an apex intersecting said optical axis, a second reflector spaced axially from a second end of said cell, and a Fabry-Perot etalon located between said two reflectors and tiltable about a tilt axis intersecting said optical axis, said etalon being characterized by the novel feature that the tilt axis of said etalon is at an angle of 45° to a plane containing said optical axis and the apex of said roof prism.

2. The invention defined in claim 1, further comprising an optical element located on said optical axis at a point between said etalon and said roof prism.

3. The invention defined in claim 2, wherein said optical element is located between said etalon and said cell.

4. The invention defined in claim 2, wherein said optical element is located between said cell and said roof prism.

5. The invention defined in claim 2, wherein said optical element is an optically active plane parallel plate.

6. The invention defined in claim 2, wherein said optical element is a plate of double refracting material.

* * * * *